UNITED STATES PATENT OFFICE.

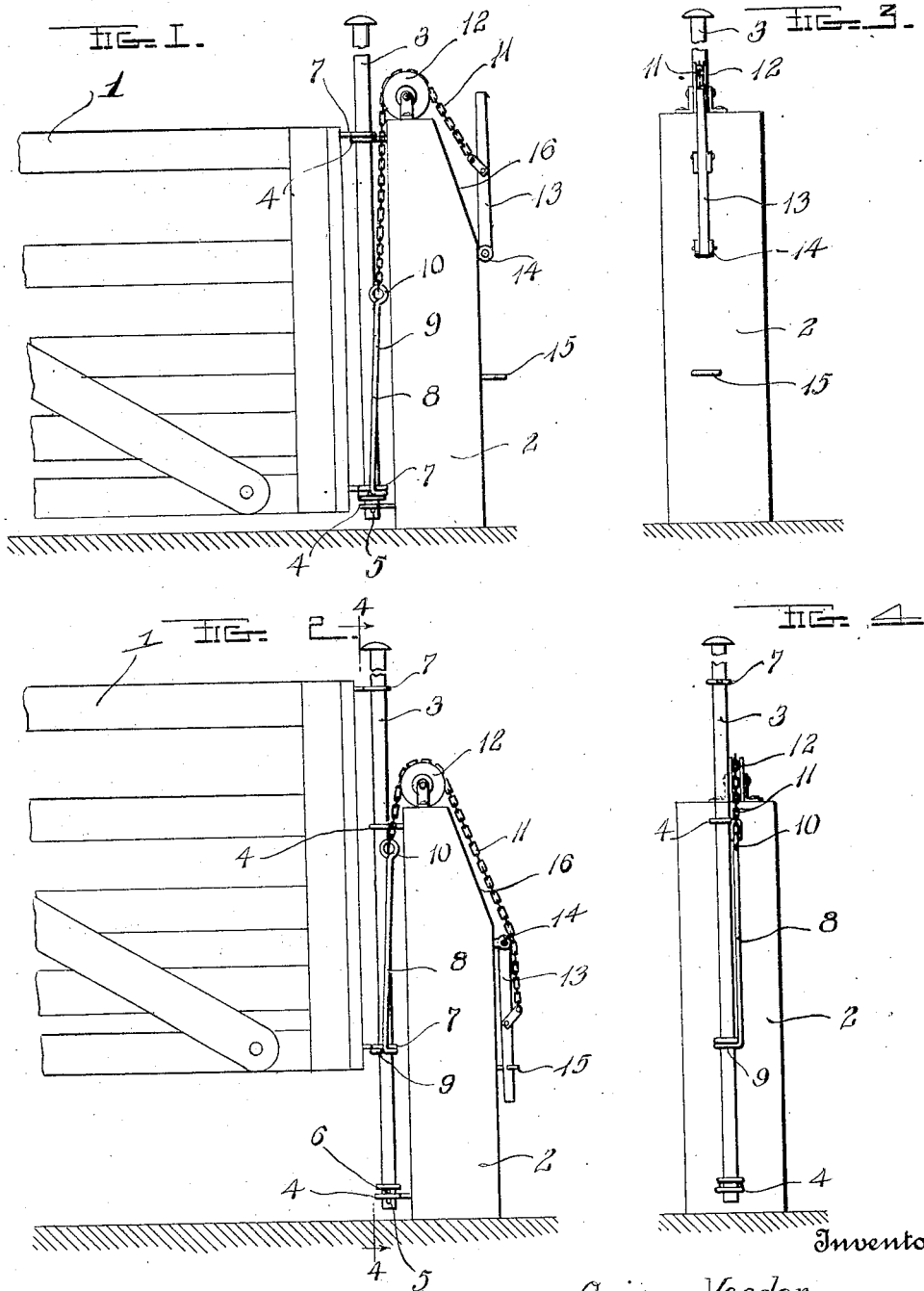

ORISON VEEDER, OF NEW WINDSOR, ILLINOIS.

VERTICALLY-ADJUSTABLE GATE.

1,349,173.

Specification of Letters Patent. Patented Aug. 10, 1920.

Application filed August 14, 1919. Serial No. 317,547.

*To all whom it may concern:*

Be it known that I, ORISON VEEDER, a citizen of the United States, residing at New Windsor, in the county of Mercer and State of Illinois, have invented certain new and useful Improvements in Vertically-Adjustable Gates; and I do declare the following to be a full, clear, and exact description of the invention, such as will enable others skilled in the art to which it appertains to make and use the same.

My invention has for its object to provide a simple and inexpensive yet an efficient and reliable means for shifting gates and the like vertically from the ground to allow small stock to pass beneath them and to permit opening of the gate without striking any obstructions on the surface of the ground.

With the foregoing in view, the invention resides in the novel construction and arrangement of parts hereinafter described and claimed, the descriptive matter being supplemented by the accompanying drawing which forms a part of this application.

Figure 1 is a side elevation of a portion of a gate mounted in accordance with my invention.

Fig. 2 is a duplicate of Fig. 1 with the exception that it illustrates the gate in raised position.

Fig. 3 is an elevation of the right hand end of Fig. 1.

Fig. 4 is a vertical section on the plane indicated by line 4—4 of Fig. 2.

In the drawing above briefly described, the numerals 1 and 2 designate respectively a gate and a gate post, said post being provided with a vertical rod 3 secured thereto but in spaced relation therewith by eye bolts or other preferred means 4. Pins 5 may be passed through the rod 3 above and below the lower eye bolt 4, and a washer 6 preferably rests on the uppermost of said pins to normally receive thereon the lowermost of a pair of eyes 7 which are carried by the gate and are slidable on the rod 3. The rod and eyes provide a hinge upon which the gate may swing and by the novel means described below, the entire gate may be raised from the position shown in Fig. 1, thereby allowing small stock such as pigs or sheep to pass beneath the gate, without permitting large stock to escape. Raising of the gate also allows opening thereof regardless of the character of the ground over which it must swing, since when said gate is raised it will strike no obstructions on the ground.

A lifting rod 8 which is substantially circular in cross section is provided on its lower end with a lateral eye 9 which slidably surrounds the rod 3 under the lowermost eye 7, the upper end of said lifting rod being provided with an eye or the like 10 by means of which it is attached to a chain or like flexible element 11. By having this rod circular in cross section, the eye 9 will readily slip upon the rod 3 and therefore no binding action will occur when lifting the gate. This chain is passed over a sheave 12 carried by the upper end of post 2 and is connected with a lever 13 which at 14 is fulcrumed to said post. The lever is normally swung upwardly as seen in Fig. 1 and consequently the gate is then in lowered position, but when said lever is forced downwardly the gate is raised as depicted in Fig. 2, and in order to hold said gate in raised position the lever may be engaged with a hook 15, with which the post 2 is provided. The upper end of this post is preferably beveled at 16 to prevent dragging of the chain thereon when lever 13 is swung downwardly.

From the foregoing, taken in connection with the accompanying drawing, it will be seen that although my invention is of simple and inexpensive nature, it will be highly efficient and desirable, and since probably the best results may be obtained from the details disclosed, they may well be followed. I wish it understood however that within the scope of the invention as claimed, numerous minor changes may well be made.

I claim:

The combination with a gate and a gate post, a vertical hinge rod connected with the post and positioned in spaced relation thereto, a gate, and eyes connected with the gate and slidably mounted upon the hinge rod, of an elongated supporting rod extending vertically of the hinge rod and having its lower end portion substantially circular in cross section and bent to provide an eye extending to one side and slidably mounted upon the hinge rod beneath the lower eye of the gate, and actuating means for raising the supporting rod and gate carried by the gate post and including a flexible element connected with the upper end of the supporting rod.

In testimony whereof I have hereunto set my hand.

ORISON VEEDER.

Witnesses:
D. W. LUNDGREN,
LILLIAN ENSTROM.